Figure 1:
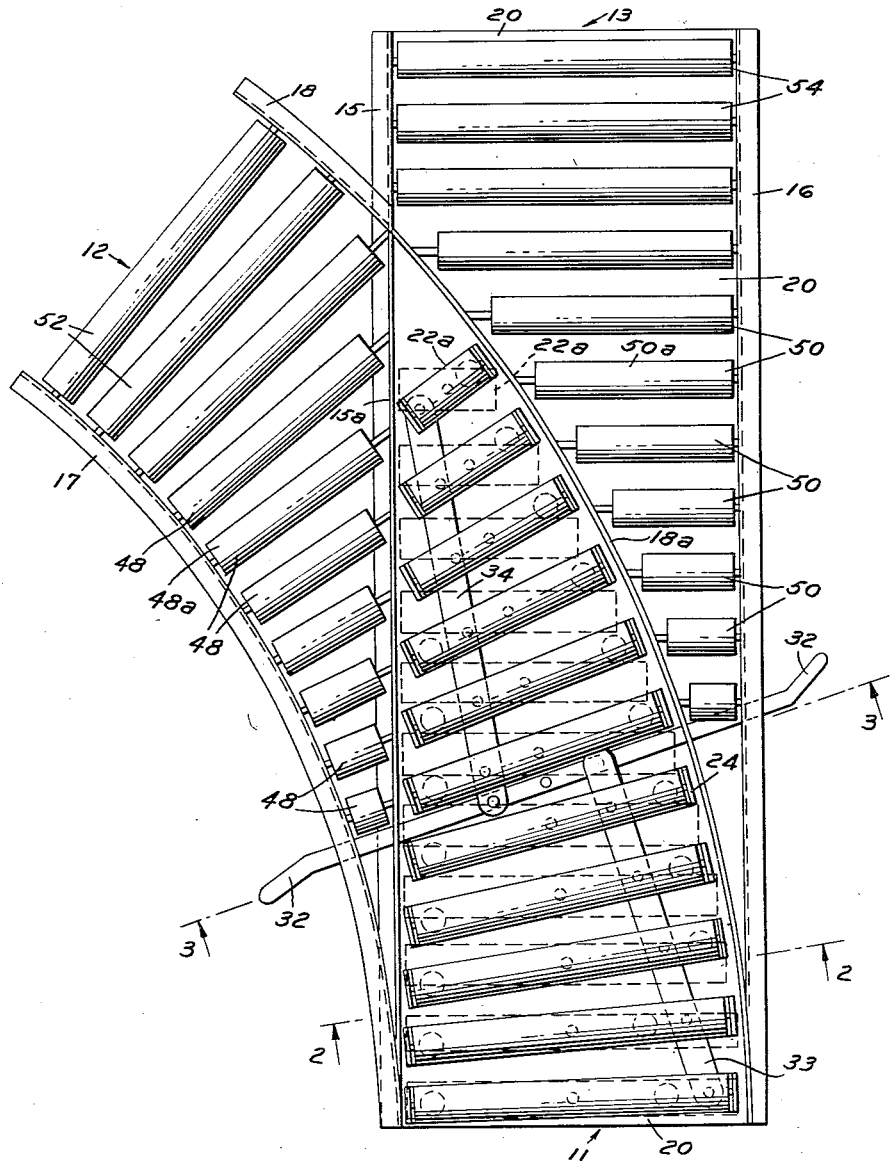

June 4, 1957  L. F. SCHMITZ  2,794,529
ROLLER CONVEYOR SWITCH
Filed Sept. 24, 1954  2 Sheets-Sheet 1

INVENTOR.
LEONARD F. SCHMITZ
BY
Farley Forster & Farley
ATTORNEYS

June 4, 1957 L. F. SCHMITZ 2,794,529
ROLLER CONVEYOR SWITCH
Filed Sept. 24, 1954 2 Sheets-Sheet 2
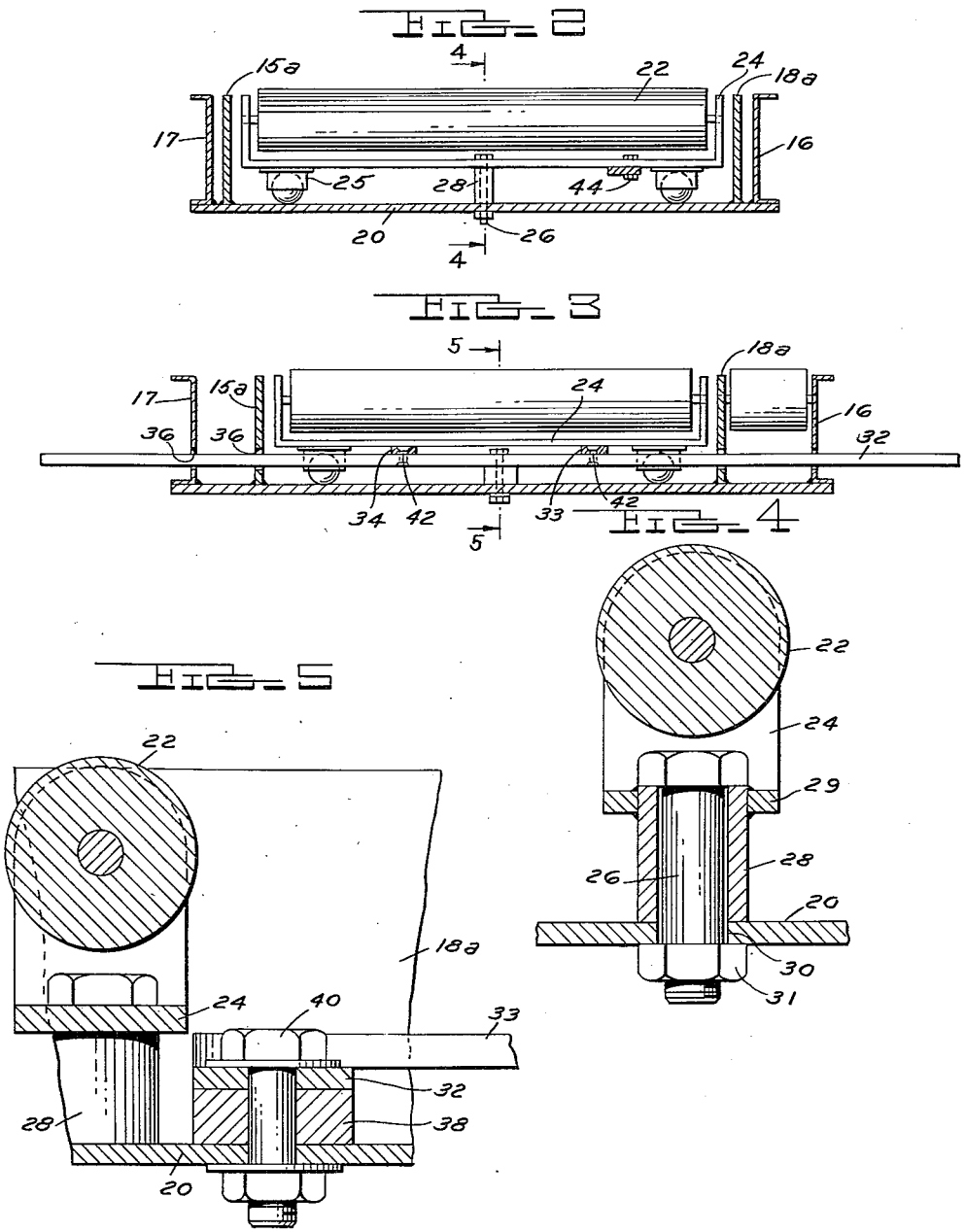
INVENTOR.
LEONARD F. SCHMITZ
BY
Farley Forster & Farley
ATTORNEYS

# United States Patent Office
2,794,529
Patented June 4, 1957

2,794,529

ROLLER CONVEYOR SWITCH

Leonard F. Schmitz, Detroit, Mich., assignor to Mechanical Handling Systems, Inc., Detroit, Mich., a corporation of Michigan Application September 24, 1954, Serial No. 458,089

9 Claims. (Cl. 193—36)

This invention relates to improvements in the construction of a switch for roller conveyor lines or roller ways where articles are conveyed upon a bed of spaced rollers having their rotational axes positioned transversely to the path of travel. The invention provides a roller way bed construction which enables articles to be conveyed to or from alternate directions, depending upon the manner in which the switch is employed.

Roller conveyors are usually prefabricated in sections which are then assembled to define a desired path of travel, which may readily be changed as desired by moving sections or employing additional ones. The present invention offers a construction suitable for a switch section for both light and heavy duty roller conveyors; a construction which can be standardized for prefabricated switch units, which offers simple and positive switching action, and which is particularly suited for prefabricated, light duty roller conveyor work.

A switch constructed in accordance with the invention may be considered as selectively defining at least two paths of travel, which progressively overlap as they converge. The area where the paths of travel overlap will be referred to as the tongue section of the switch, or, in other words, the tongue section is that portion of the roller conveyor bed which is common to more than one path of travel through the switch. In plan, a tongue section is generally triangular in shape and is composed of a series of rollers whose length progressively increases with the extent of overlap of the paths of travel. These rollers are mounted so as to be movable in unison from a position where their axes are substantially perpendicular of one path of travel to a position where their axes are substantially perpendicular to the other path of travel. The tongue section rollers are bordered by a series of fixed rollers for each path of travel, with the length of each fixed roller being such as to complete the width of the conveyor bed for one path of travel when added to the length of a laterally adjacent movable roller of the tongue section. As the length of the movable rollers increases, the length of the fixed rollers of either series decreases.

Preferably, the rollers of the tongue section are each supported at a point substantially midway of their length on a vertical pivotal axis which serves as a means to define their position laterally. These rollers are further supported vertically, preferably on antifriction means for free movement about the aforementioned vertical pivotal axes. Actuating means are employed for moving each roller of the tongue section series from one position to another, with an arrangement which provides varying increments of movement so that a relation of parallelism can be obtained between any roller of the tongue section series and the adjacent fixed roller in either position of the switch.

A presently preferred embodiment of the invention is illustrated in the accompanying drawing, and will be described in detail in order to more fully explain the principles of construction and operation.

This drawing comprises the following views:

Fig. 1, a plan view of a switch section with the rollers of the tongue section thereof being shown in full in one position and being indicated in phantom in another position;

Fig. 2, a sectional elevation taken along the line 2—2 of Fig. 1 showing the construction and mounting of one of the rollers of the tongue section of the switch;

Fig. 3, a sectional elevation taken along the line 3—3 of Fig. 1 showing the main actuating crank and the sectional construction;

Fig. 4, an enlarged sectional elevation taken along the line 4—4 of Fig. 2 showing the pivotal mounting of one the rollers of the tongue section; and Fig. 5, an enlarged sectional elevation taken along the line 5—5 of Fig. 3.

Referring to Fig. 1, the switch there shown provides three ends of entrance or exit, as indicated by the references 11, 12 and 13. The bed of the conveyor upon which articles are supported is composed of parallel rollers in the customary manner, and it will be seen that a portion of the path of travel between ends 11 and 12 is common to a portion of the path of travel between ends 11 and 13. This section of the conveyor bed common to both paths of travel is what has been previously referred to as the tongue section of the switch.

Side rails 15 and 16 extend along either side of the path of travel between the ends 11 and 13. A second set of side rails 17 and 18 extend along either side of the curved path of travel between the ends 11 and 12. The tongue section of the switch is bounded by the portion 15a of the side rail 15 and by the curved vertically extending plate 18a which forms a continuation of the side rail 18. A bottom panel 20 extends between the side rails 15 and 16 all along the length thereof between the ends 11 and 13 of the switch. In addition to connecting the side rails 15 and 16, this bottom panel 20 forms a support for a series of movable rollers 22 of the tongue section, which occupy the generally triangular area between the side rails 15a and 18a.

This construction is best shown in Fig. 2. Each of the movable rollers 22 is mounted in a U-shaped frame member 24, which is equipped with a pair of ball type castors 25 adapted to ride on the upper surface of the panel 20. Each U-shaped frame 24 is connected to the panel 20 by a pivot pin 26 which defines a pivotal axis, located, in the construction shown, midway between the ends of each of the U-shaped frame members 24. An enlarged detail of this pivotal connection is given in Fig. 4. A spacing sleeve 28 is secured within an aperture 29 formed in the frame member 24. The pivot pin or bolt 26 is mounted within the sleeve 28, and extends through a hole 30 in the panel 20 to receive a nut 31, which is adjusted so that free pivotal movement of each of the frames 24 can be obtained. This pivotal movement is controlled by an actuating lever 32 and a pair of links 33 and 34.

The actuating lever 32 extends transversely of the switch structure below the level of the roller frames 24, through suitable apertures 36 provided in the side members, all as shown in Fig. 3. Actuating lever 32 is pivotally connected to the bottom plate 20 as shown in the detail Fig. 5. A spacer block 38 is employed to hold the actuating lever 32 above the level of the bottom plate 20, and a bolt 40 passes through the actuating lever 32, the spacer block 38, and the bottom panel 20.

Each of the links 33 and 34 are secured to the upper side of the actuating lever 32 by a pivot pin 42 (Fig. 3). The links pass underneath the frame members 24 of each of the rollers 22 and are pivotally secured to each frame by a bolt 44 as shown in Fig. 2. The distance between the pivotal axis 26 of each of the roller frames 24 and the point of pivotal connection of the link 33 or 34 thereto, is varied in progressive increments along the tongue section of the switch. Thus, a given amount of movement of the actuating lever 32 results in varying degrees of pivotal movement of each of the rollers 22 so that the longitudinal axis of each roller 22 lies substantially on a radial line for the arcuate path of travel between the ends 11 and 12.

Along the arcuate path of travel 11—12, the conveyor bed is completed by a series of rollers 48, of varying lengths, whose axes are fixedly mounted between the outer side frame 17 of the structure and the side member 15a defining the tongue section. These rollers 48 also have their axes radially disposed, or directed toward the center of curvature of the path of travel 11—12. The length of each of the rollers 48 of the series is complementary to the length of an adjacent roller 22 of the tongue section series, in the sense that the combined length of two adjacent rollers, e. g., the rollers 48a and 22a, is substantially equal to the width of the path of travel. The remaining path of travel 11—12 is completed by fixed, radially disposed rollers 52, mounted between the side frames 17 and 18.

The bed of the path of travel 11—13 is completed by a series of rollers 50, of varying lengths, fixedly mounted between the side frame 16 and the upright member 18a defining the other side of the tongue section. These rollers 50 are perpendicular to the path of travel 11—13 in the customary manner, and again are each complementary in length to an adjacent roller 22 of the tongue section (e. g., rollers 22a and 50a). The remaining portion of the path of travel 11—13 is completed by a series of rollers 54 extending between the side frames 15 and 16.

All rollers used in the construction are mounted so that their upper surfaces are above the upper edge of the side members 15a and 18a bordering the tongue section. For purposes of definition, the rollers 48 and 50, which together with the rollers 22 of the tongue section serve to complete the width of the conveyor bed for either path of travel, will be referred to as "complementary" rollers. The rollers 22 of the tongue section will be referred to as "tongue" rollers.

The specific construction illustrated has been designed primarily for light duty work. However, it will be appreciated by those skilled in the art that the constructional principles involved can readily be applied to structures of varying sizes and load capacities, without departing from the scope of the invention as defined in the following claims.

I claim:

1. A roller conveyor switch construction having, with respect to one direction of travel of articles being conveyed, an entrance and at least two exits, comprising a tongue section forming that portion of the conveyor bed common to the paths of travel from the entrance to each exit, said tongue section including a series of rollers progressively decreasing in length toward the exit side of said switch, each of said exits including a series of rollers progressively increasing in length toward the exit side of said switch, means mounting the rollers of each of said exit series adjacent one of the ends of the rollers of said tongue section with the axes of the rollers of each of said exit series being disposed substantially perpendicular to the path of travel to each exit whereby said tongue section rollers and either of said series of exit section rollers form an article supporting bed of uniform width, and means for moving the series of rollers of said tongue section from a position where the axes thereof are substantially parallel to the axes of the rollers of one exit series to a position where the axes of the tongue section rollers are substantially parallel to the axes of the rollers of the other exit series.

2. A roller conveyor switch construction providing a conveyor bed for alternate paths of travel comprising a series of tongue rollers forming that portion of the conveyor bed common to all paths of travel, a series of complementary rollers positioned adjacent the ends of said tongue rollers to form the remaining portion of the conveyor bed for each path of travel, the combined length of each tongue roller and the complementary roller adjacent thereto being substantially equal to the width of the conveyor bed for a particular path of travel, supporting means positioning each complementary roller with its axis fixed transversely of a path of travel, means mounting said tongue rollers for movement of the axes thereof in a direction substantially parallel to the plane of the conveyor bed, and actuating means connected to each of said tongue rollers whereby said rollers can be moved from a portion where their axes are substantially parallel to the axes of one series of adjacent complementary rollers to a position where their axes are substantially parallel to the axes of another series of adjacent complementary rollers.

3. A switch construction providing a roller conveyor bed for alternate diverging paths of travel, portions of which overlap in the region of divergence, comprising a tongue section defined by any portion of the conveyor bed common to more than one path of travel and formed by a series of rollers of varying lengths, each of said rollers being mounted for pivotal movement of the axis thereof in a direction substantially parallel to the plane of the conveyor bed, actuating means for moving the rollers of a tongue section from a position where the axes thereof are substantially perpendicular to one path of travel to a position where said axes are substantially perpendicular to an overlapping adjacent path of travel, and axially fixed rollers mounted adjacent the ends of said tongue section rollers for completing those portions of said conveyor bed not common to more than one path of travel.

4. A switch construction according to claim 3 wherein the edge of each path of travel is defined by a frame member, said axially fixed rollers being mounted between the frame member of one path of travel and a laterally adjacent frame member defining another path of travel.

5. A switch construction according to claim 3 further characterized by the tongue section thereof including a bottom panel to which the tongue rollers are each pivotally connected on a vertical pivotal axis located intermediate the ends thereof, and antifriction means supporting each tongue roller on said bottom panel for movement about said pivotal axis.

6. A switch construction according to claim 3 further characterized by the tongue section thereof being provided with a bottom panel, each tongue roller being individually mounted in a U-shaped frame member supporting the ends of the axis of said roller and extending underneath said roller, means pivotally connecting said U-shaped frame member to said bottom panel and antifriction means carried by each frame member and adapted to contact said bottom panel to support each tongue roller thereon for movement about the said vertical pivotal axis thereof.

7. A switch construction as set forth in claim 6 further characterized by the provisions of actuating means for moving said tongue rollers comprising a member secured to the frame member of each tongue roller at a point spaced from the vertical pivotal axis thereof and means for controlling the position of said member.

8. A switch construction as set forth in claim 7 wherein said actuating member is secured to the frame member of each tongue roller at a progressively varying distance from the vertical pivotal axis thereof throughout the series of tongue rollers whereby the rollers of the tongue section can be positioned to define a curved diverging path of travel.

9. A switch construction providing a roller conveyor bed for alternate diverging paths of travel, portions of which overlap in the region of divergence, comprising a tongue section defined by any portion of the conveyor bed common to more than one path of travel and formed by a series of rollers of varying lengths, means supporting each roller of said tongue section on a fixed pivotal axis perpendicular to the conveyor bed and intermediate the ends of such roller for movement between one position where the axes of said tongue section rollers are substantially perpendicular to one path of travel and another position where said axes are substantially perpendicular to an overlapping adjacent path of travel, actuating means for positioning said tongue section rollers, and a series of axially fixed rollers mounted adjacent each of the ends of said tongue section rollers for completing each portion of the conveyor bed not common to more than one path of travel.

References Cited in the file of this patent

UNITED STATES PATENTS

| | | |
|---|---|---|
| 1,896,402 | Griffith | Feb. 7, 1933 |
| 2,136,267 | Taylor | Nov. 8, 1938 |

FOREIGN PATENTS

| | | |
|---|---|---|
| 63,896 | Sweden | Dec. 19, 1924 |